United States Patent [19]
Katayama

[11] Patent Number: 5,917,556
[45] Date of Patent: Jun. 29, 1999

[54] SPLIT WHITE BALANCE PROCESSING OF A COLOR IMAGE

[75] Inventor: Andrew S. Katayama, Cardiff, Calif.

[73] Assignee: Eastman Kodak Company, Rochester, N.Y.

[21] Appl. No.: 08/820,622

[22] Filed: Mar. 19, 1997

[51] Int. Cl.[6] .................................................. H04N 9/73
[52] U.S. Cl. ........................ 348/655; 348/223; 348/280
[58] Field of Search .................................. 348/655, 223, 348/228, 273, 280; H04N 9/73

[56] References Cited

U.S. PATENT DOCUMENTS

| | | | |
|---|---|---|---|
| 3,971,065 | 7/1976 | Bayer . | |
| 4,234,890 | 11/1980 | Astle | 348/223 |
| 4,706,108 | 11/1987 | Kumagai | 348/655 |
| 5,668,596 | 9/1997 | Vogel | 348/273 |

*Primary Examiner*—Sherrie Hsia
*Attorney, Agent, or Firm*—William F. Noval

[57] ABSTRACT

A method for correcting a color video signal for white balance comprising the steps of:

providing a digital color image signal having a sequence of monocolor pixels, wherein each of the pixels represents one color of first, second, and third different colors, which are repeated in a preset pattern;

coarse white balance processing each monocolor pixel for a coarse white balance;

spatial processing the sequence of monocolor pixels to produce a sequence of tricolor pixels, wherein each of the tricolor pixels represents the first, second, and third different colors; and color correction and fine white balance processing each of the tricolor pixels by means of a matrix multiplier for color correction and fine white balance.

4 Claims, 2 Drawing Sheets

SPLIT WHITE BALANCE PROCESSING OF A COLOR IMAGE

FIELD OF INVENTION

This invention relates in general to color image processing and relates more particularly to the white balance processing of a color image which effects an accurate white balance of the color image in real time and with an economic approach.

BACKGROUND OF THE INVENTION

In one type of color imaging array as disclosed in U.S. Pat. No. 3,971,065, issued Jul. 20, 1976, inventor Bayer, a mosaic of selectively transmissive filters is superposed in registration with a solid state imaging array having a broad range of light sensitivity. The distribution of filter types in the mosaic is such that one color, such as green, representing a luminance signal, predominates over filters for other colors such as red and blue. Thus, in one filter format, the green filters alternate both horizontally and vertically with either a blue filter or a red filter. Thus, half of the pixels represent green, while a quarter each of the remaining pixels represent red and blue. The filter format can be selected to represent different proportions of green, red, and blue. In such a color imaging array, the individual pixels must be processed by means of (1) a white balance operation on each of the three color components, (2) spatial interpolation to recover the original scene colors having parallel red, blue, and green components, and (3) a color-correction matrix in order to produce a correct color rendering which can be used to display the image on a color monitor.

Incoming pixels are defined as a sparse matrix. This is defined as a sparse matrix such that matrix arithmetic notation can be used to describe the operations. For the Bayer CFA (Color Filter Array), there are three pixel colors, that of Red, Green, and Blue. First, a generic RGB triplet is defined, and then a representation of actual pixels as they are read off of the sensor are shown as a sparse form of this matrix. Thus, for a generic RGB triplet and their actual Bayer equivalents:

$$P_{rgb} = [r \; g \; b] \quad \text{Eq. 1 a–d}$$
$$P_{bayer-r} = [r \; 0 \; 0]$$
$$P_{bayer-g} = [0 \; g \; 0]$$
$$P_{bayer-b} = [0 \; 0 \; b]$$

It is also determined, at the user's discretion, a set of white balance coefficients. These white balance coefficients are based on the selection by the user of a neutral area of the image. All of the red, green, and blue pixels are taken in this region, and after subtracting the black setup value, their ratios are computed in order to derive the necessary white balance coefficients. This triplet is denoted as follows:

$$k_{wb} = \begin{bmatrix} k_{wb-r} & 0 & 0 \\ 0 & k_{wb-g} & 0 \\ 0 & 0 & k_{wb-b} \end{bmatrix} \quad \text{Eq. 2}$$

The spectral response of the sensor is characterized in order to be able to compute an optimal color correction matrix. Essentially, this 3×3 matrix is an array of 9 coefficients which gets multiplied by the fully reconstructed RGB triplets. This results in a color corrected RGB triplet This color correction matrix denoted as follows:

$$k_{cc} = \begin{bmatrix} k_{cc-r'r} & k_{cc-r'g} & k_{cc-r'b} \\ k_{cc-g'r} & k_{cc-g'g} & k_{cc-g'b} \\ k_{cc-b'r} & k_{cc-b'g} & k_{cc-b'b} \end{bmatrix} \quad \text{Eq. 3}$$

The sequencing of white balancing, spatial processing, and then color correcting can be seen as the following sequence of operations.

Given an input pixel $$p_{input} = [r_{input} \; g_{input} \; b_{input}],$$

there is first calculated a white balanced version of it, $p_{wb}$, as follows:

$$p_{wb} = p_{input} \cdot k_{wb} \quad \text{Eq. 4 a–c}$$
$$= [r_{input} \; g_{input} \; b_{input}] \cdot \begin{bmatrix} k_{wb-r} & 0 & 0 \\ 0 & k_{wb-g} & 0 \\ 0 & 0 & k_{wb-b} \end{bmatrix}$$
$$= [r_{wb} \; g_{wb} \; b_{wb}]$$

Keep in mind that as these still describes the pixel at the input, that the triplets are degenerated such that only one of their components is non-zero, depending on the color of the pixel.

This resulting pixel is passed through the spatial processing, which can be represented as follows:

$$p'_{wb} = f_{spatial\_processing}(p_{wb}) \quad \text{Eq. 5 a–b}$$
$$= [r'_{wb} \; g'_{wb} \; b'_{wb}]$$

By this time, the pixel is fully reconstructed, so this latter matrix represents a full RGB triplet. Next, this result is multiplied with the color-correction matrix to obtain the following result:

$$p_{final} = p'_{wb} \cdot k_{cc} \quad \text{Eq. 6 a–c}$$
$$= [r'_{wb} \; g'_{wb} \; b'_{wb}] \cdot \begin{bmatrix} k_{cc-r'r} & k_{cc-r'g} & k_{cc-r'b} \\ k_{cc-g'r} & k_{cc-g'g} & k_{cc-g'b} \\ k_{cc-b'r} & k_{cc-b'g} & k_{cc-b'b} \end{bmatrix}$$
$$= [p_{final-r} \; p_{final-g} \; p_{final-b}]$$

One of the most costly numerical operations in silicon-based signal processing is to do a multiply. However, multiplies are throughout the latter algorithm.

It would be desirable to provide color correction and white balance processing of a color image that solves the problems discussed above.

SUMMARY OF THE INVENTION

According to the present invention, there is provided a solution to the problems of the prior art.

We note that white balancing is performed before the bulk of the signal processing because with fixed precision data, the result of a multiplication of a factor greater than unity can result in a histogram distribution of pixel values which has holes in it. By performing white balance early, these holes in the histogram can be filled in by any downstream processing.

According to a feature of the present invention, there is provided a method for correcting a color video signal for white balance comprising the steps of providing a digital color image signal having a sequence of monocolor pixels, wherein each of the pixels represents one color of first, second, and third different colors, which are repeated in a preset pattern; coarse white balance processing each monocolor pixel for a coarse white balance; spatial processing the sequence of monocolor pixels to produce a sequence of tricolor pixels, wherein each of the tricolor pixels represents the first, second, and third different colors; and color correction and fine white balance processing each of the tricolor pixels by means of a matrix multiplier for color correction and fine white balance.

ADVANTAGEOUS EFFECT OF THE INVENTION

The present invention has the following advantages.

1. Through the use of a distributed approach to perform white balance, there is achieved both economy of approach as well as accurate white balance.

2. The impact of combining white balance gain and color correction in a single operation is minimized by coarse white balance preprocessing.

DETAILED DESCRIPTION OF THE INVENTION

Figure 1:
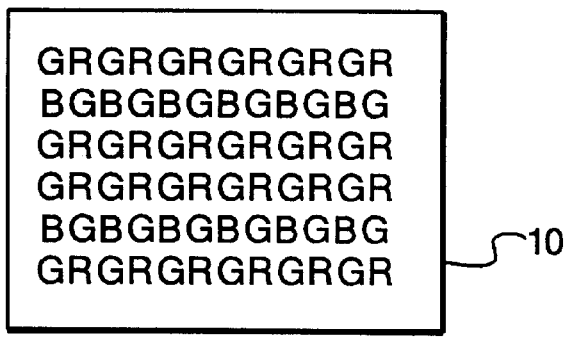
FIG. 1 is a diagrammatic view of a color sensor using a Bayer type filter array.

Referring now to FIG. 1, there is shown a diagrammatic view of a color image sensor 10 having a color filter array having a repeating pattern of pixel sized color filters disposed over an array of photosensors having a broad spectral range. The filter pattern shown has a repeating color filter pattern of G(Green)R(Red) in the first line; a repeating color filter pattern of B(Blue)G in the second line; and a repeating color filter pattern of GR in the third line. It will be understood that the color filter pattern shown is exemplary only and that other patterns can be used.

Figure 2:
FIG. 2 is a diagrammatic view depicting a sequence of pixels read from the first three lines of the sensor of FIG. 1.

FIG. 2 is a diagrammatic view of a sequence of pixels which have been read out from the first three lines of sensor 10. For illustration purposes, it is assumed that each pixel has been digitized to a pixel depth of 8 bits. Since each pixel only represents a single color, i.e., G, R, or B, in order to preserve the resolution of the image when it is to be displayed in full color on a color video display, each pixel is processed so that three 8-bit color components are produced for each pixel (24 bits per pixel).

Figure 3:
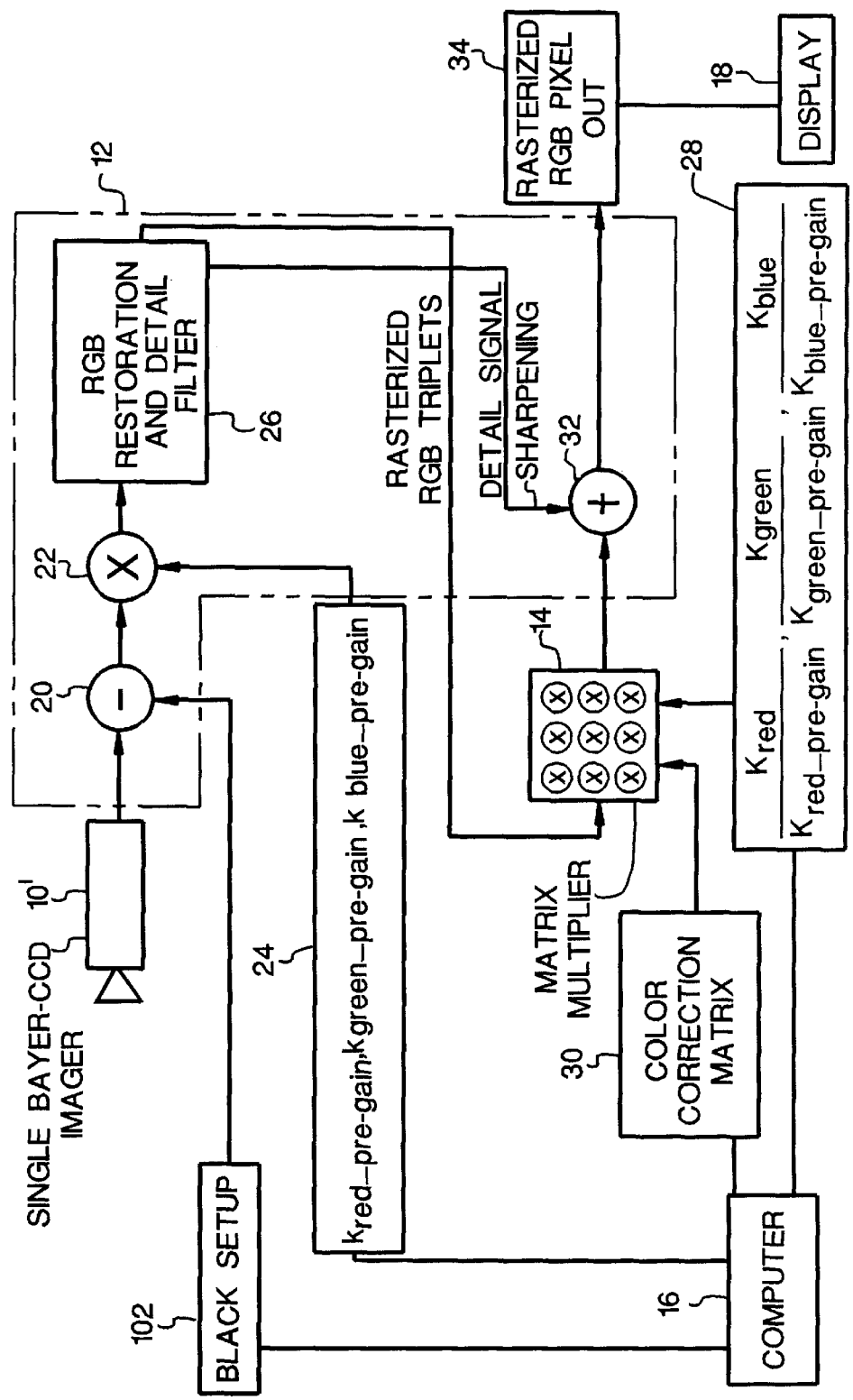
FIG. 3 is a block diagram of a color imaging system incorporating the present invention.

A color imaging system incorporating the present invention is shown in FIG. 3. The system includes a single Bayer array CCD imager 10', a field programmable gate array (FPGA) 12, matrix multiplier 14, computer 16, and display 18. As shown, a Bayer encoded imager 10' produces a digital image signal having 8 bits per pixel. Each pixel represents one of the colors R, G, B. The digital pixels from imager 10' are processed by FPGA 12. FPGA 12 includes a setup correction subtractor 20 which subtracts black setup data (supplied by computer 16) from the monocolor pixel. Coarse white balance pregain processing is then performed by multiplier 22 which receives white balance pregain data 24 from computer 16.

Each monocolor pixel is processed into a tricolor RGB pixel by RGB restoration and detail filter circuit 26. The rasterized RGB triplet tricolors are processed for color correction and fine white balance by matrix multiplier 14 which receives color correction matrix data 30, and red, green, and blue fine white balance data 28 from computer 16. The tricolor pixel is sharpened in adder 32 which receives detail signal from circuit 26.

The rasterized RGB tricolor pixel 34 outputted from FPGA 12 is displayed on display 18.

The method of the present invention incorporated in the system of FIG. 3 will now be explained in greater detail.

In the processing method of the invention, the multiplication by $k_{wb}$ is divided into two parts. The first part approximates the full precision $k_{wb}$ as $k_{coarse-wb}$, which is designed to be roughly equal to $k_{wb}$, but sacrifices precision in order to limit the values to low Hamming weight. (The Hamming weight of a number is equivalent to the number of 1's in its binary representation. For example, H(5)=H (101b)=2.) This way, this first part of the multiplication can be done with additions and shifts. Thus:

$$k_{coarse-wb} = \begin{bmatrix} k_{coarse-wb-r} & 0 & 0 \\ 0 & k_{coarse-wb-g} & 0 \\ 0 & 0 & k_{coarse-wb-b} \end{bmatrix} \quad \text{Eq. 7}$$

The determination of $k_{coarse-wb}$ will be explained later.

The second part, $k_{fine-wb}$, represents a matrix constructed out of the member-wise ratio $$\frac{k_{web}}{k_{coarse-wb}}.$$

Thus:

$$k_{fine-wb} = \begin{bmatrix} \frac{k_{wb-r}}{k_{coarse-wb-r}} & 0 & 0 \\ 0 & \frac{k_{wb-g}}{k_{coarse-wb-g}} & 0 \\ 0 & 0 & \frac{k_{wb-b}}{k_{coarse-wb-b}} \end{bmatrix} \quad \text{Eq. 8}$$

This result is combined with the color-correction matrix to arrive at a combined matrix as follows:

$$k_{combined} = k_{cc} \cdot k_{fine-wb}$$

$$= \begin{bmatrix} \left(\frac{k_{wb-r}}{k_{coarse-wb-r}}\right) \cdot k_{cc-r'r} & \left(\frac{k_{wb-r}}{k_{coarse-wb-r}}\right) \cdot k_{cc-r'g} & \left(\frac{k_{wb-r}}{k_{coarse-wb-r}}\right) \cdot k_{cc-r'b} \\ \left(\frac{k_{wb-g}}{k_{coarse-wb-g}}\right) \cdot k_{cc-g'r} & \left(\frac{k_{wb-g}}{k_{coarse-wb-g}}\right) \cdot k_{cc-g'g} & \left(\frac{k_{wb-g}}{k_{coarse-wb-g}}\right) \cdot k_{cc-g'b} \\ \left(\frac{k_{wb-b}}{k_{coarse-wb-b}}\right) \cdot k_{cc-b'r} & \left(\frac{k_{wb-b}}{k_{coarse-wb-b}}\right) \cdot k_{cc-b'g} & \left(\frac{k_{wb-b}}{k_{coarse-wb-b}}\right) \cdot k_{cc-b'b} \end{bmatrix} \quad \text{Eq. 9 a–b}$$

Thus, the entire new procedure can be seen as comprising the following steps:

$$p_{final} = p'_{wb} \cdot k_{cc} \quad \text{Eq. 12 a–c}$$

$$= [r'_{wb}\; g'_{wb}\; b'_{wb}] \begin{bmatrix} \left(\frac{k_{wb-r}}{k_{coarse-wb-r}}\right) \cdot k_{cc-r'r} & \left(\frac{k_{wb-r}}{k_{coarse-wb-r}}\right) \cdot k_{cc-r'g} & \left(\frac{k_{wb-r}}{k_{coarse-wb-r}}\right) \cdot k_{cc-r'b} \\ \left(\frac{k_{wb-g}}{k_{coarse-wb-g}}\right) \cdot k_{cc-g'r} & \left(\frac{k_{wb-g}}{k_{coarse-wb-g}}\right) \cdot k_{cc-g'g} & \left(\frac{k_{wb-g}}{k_{coarse-wb-g}}\right) \cdot k_{cc-g'b} \\ \left(\frac{k_{wb-b}}{k_{coarse-wb-b}}\right) \cdot k_{cc-b'r} & \left(\frac{k_{wb-b}}{k_{coarse-wb-b}}\right) \cdot k_{cc-b'g} & \left(\frac{k_{wb-b}}{k_{coarse-wb-b}}\right) \cdot k_{cc-b'b} \end{bmatrix}$$

$$= [p_{final-r}\; p_{final-g}\; p_{final-b}]$$

Given an input pixel $$p_{input} = [r_{input}\; g_{input}\; b_{input}],$$

first there is calculated a coarsely white balanced version of it, $p_{wb}$, as follows:

$$p_{wb} = p_{input} \cdot k_{coarse-wb} \quad \text{Eq. 10 a–c}$$

$$= [r_{input}\; g_{input}\; b_{input}] \cdot \begin{bmatrix} k_{coarse-wb-r} & 0 & 0 \\ 0 & k_{coarse-wb-g} & 0 \\ 0 & 0 & k_{coarse-wb-b} \end{bmatrix}$$

$$= [r_{wb}\; g_{wb}\; b_{wb}]$$

Then, this resulting pixel is passed through the spatial processing, which can be represented as follows:

$$p'_{wb} = f_{spatial\_processing}(p_{wb}) \quad \text{Eq. 11 a–b}$$

$$= [r'_{wb}\; g'_{wb}\; b'_{wb}]$$

By this time, the pixel is fully reconstructed, so this latter matrix represents a full RGB triplet. Next, this result is multiplied with the combined color correction and fine white balance matrix to obtain the following result:

The goal of the reduction in the precision of $k_{coarse-wb}$ is to reduce the Hamming weight of the coefficients (or of their 2's complement) used in the multiplication. This is to minimize the implementation costs of the multiplier to only a set of shifts and additions or subtractions. Thus, there is predetermined a set of possible values for the coefficients which satisfies this requirement. For this implementation, there is chosen 1.0, 1.5, 2.0, and 2.5. In binary, these are 1.0b, 1.1b, 10.0b, and 10.1b, respectively. In this case, there is a maximum Hamming weight of 2, implying a maximum of one addition. More coefficients can be chosen as desired. To multiply these coefficients by an arbitrary number a, the following can be done:

$1.0 \cdot a = a$ $1.5 \cdot a = a + (a >> 1)$ $2.0 \cdot a = a << 1$ $2.5 \cdot a = (a << 1) + (a >> 1)$ Any of these coefficients can be implemented either as shifts and additions or subtractions. In the case of subtractions, one wants to see a minimal Hamming weight of the 2's complement of the coefficient (after casting out leading 0's as well as trailing 0's after the decimal point). Thus, if a particular coefficient's Hamming weight might otherwise be too high, it may be advantageous to consider it's 2's complement. To put the two on an equal footing, one should add one to the Hamming weight of the 2's complement to compare it to the Hamming weight of the original coefficient. As an example, the multiplication by 2.5 can also be handled as follows:

$$2.5 \cdot a = (a<<2) - a - (a>>1)$$

Of course, in this case, implementing the multiplication as an addition is more cost effective, as the subtraction approach required a total of two subtractions, instead of just one addition. This cost can be evaluated by comparing their adjusted Hamming weights as follows:

$$H(10.1b) = 2 \text{(addition)}$$

$$H(01.1b) + 1 = 3 \text{(subtraction)}$$

This clearly shows the addition approach is a more efficient solution for this particular example. Another example with a coefficient of 7(111.0b) is shown below.

$$7 \cdot a = (a<<2) + 9a<<1) + a \text{(addition)}$$

$$7 \cdot a = (a<<3) - a \text{(subtraction)}$$

In this case, the subtraction is clearly more efficient. Again, this can be seen by comparing their adjusted Hamming weights as follows:

$$H(111.0b) = 3 \text{(addition)}$$

$$H(001.0b) + 1 = 2 \text{(subtraction)}$$

There would also be cases where the costs would be equivalent Such an example would be a coefficient such as 6(110.0). Their respective implementations and their adjusted Hamming weights are as follows:

$$6 \cdot a = (a<<2) + (a<<1)$$

$$6 \cdot a = (a<<3) - (a<<1)$$

$$H(110.0b) = 2 \text{(addition)}$$

$$H(010.0b) + 1 = 2 \text{(subtraction)}$$

The invention has been described with respect to specific embodiments, but it will be understood that variations and modifications can be effected within the spirit and scope of the invention.

| Parts List | |
|---|---|
| 10 | color image sensor |
| 10' | CCD imager |
| 12 | field programmable gate array (FPGA) |
| 14 | multiplier |
| 16 | computer |
| 18 | display |
| 20 | subtractor |
| 22 | multiplier |
| 24 | data |
| 26 | circuit |
| 28 | data |
| 30 | data |
| 32 | adder |
| 34 | pixel |

What is claimed is:

1. A method for correcting a color video signal for white balance comprising the steps of:

providing a digital color image signal having a sequence of monocolor pixels, wherein each of said pixels represents one color of first, second, and third different colors, which are repeated in a preset pattern;

coarse white balance processing each monocolor pixel for a coarse white balance;

spatial processing said sequence of monocolor pixels to produce a sequence of tricolor pixels, wherein each of said tricolor pixels represents said first, second, and third different colors; and color correction and fine white balance processing each of said tricolor pixels by means of a matrix multiplier for color correction and fine white balance.

2. The method of claim 1 wherein said providing step includes the step of reading out a solid state area imager having a matrix of photosites which are filtered by a color filter array including a repetitive filter pattern of said first, second and third different colors.

3. The method of claim 1 wherein said first, second, and third colors are, respectively, red, green, and blue.

4. The method of claim 3 wherein said preset pattern is a matrix of green, blue/red, green.

* * * * *